(12) United States Patent
Branson et al.

(10) Patent No.: US 11,516,230 B2
(45) Date of Patent: Nov. 29, 2022

(54) SELECTIVE ENCRYPTION OF DATA IN MOTION

(71) Applicant: International Business Machines Corporation, Armonk, NY (US)

(72) Inventors: Michael J. Branson, Rochester, MN (US); Ryan K. Cradick, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 16/939,389

(22) Filed: Jul. 27, 2020

(65) Prior Publication Data
US 2022/0030012 A1 Jan. 27, 2022

(51) Int. Cl.
*H04L 9/40* (2022.01)

(52) U.S. Cl.
CPC ...... *H04L 63/1416* (2013.01); *H04L 63/0236* (2013.01); *H04L 63/0263* (2013.01); *H04L 63/0435* (2013.01); *H04L 63/20* (2013.01)

(58) Field of Classification Search
CPC ............ H04L 63/1416; H04L 63/0236; H04L 63/0263; H04L 63/0435; H04L 63/20
See application file for complete search history.

(56) References Cited

U.S. PATENT DOCUMENTS

| | | | |
|---|---|---|---|
| 7,237,108 B2 | 6/2007 | Medvinsky et al. | |
| 7,320,069 B1 | 1/2008 | Sundharraj et al. | |
| 7,353,380 B2 | 4/2008 | VanHeyningen | |
| 7,707,427 B1 | 4/2010 | Kenrich et al. | |
| 8,127,366 B2 | 2/2012 | Vainstein et al. | |
| 8,538,020 B1 | 9/2013 | Miller | |
| 9,608,810 B1* | 3/2017 | Ghetti | H04L 9/0822 |
| 11,120,141 B2* | 9/2021 | Krishnamurthy | G06F 21/6218 |
| 2002/0133699 A1 | 9/2002 | Pueschel | |
| 2007/0242696 A1 | 10/2007 | Signaoff et al. | |
| 2010/0333116 A1* | 12/2010 | Prahlad | G06F 3/067 |
| | | | 713/153 |
| 2019/0005248 A1* | 1/2019 | Krishnamurthy | H04L 63/0428 |
| 2019/0297063 A1* | 9/2019 | De Gaspari | H04L 9/0847 |
| 2020/0311288 A1* | 10/2020 | Yankovskiy | H04L 9/0894 |

OTHER PUBLICATIONS

Selvakumar, S., and M. Mohanapriya. "Securing cloud data in transit using data masking technique in cloud enabled multi tenant software service." Indian Journal of Science and Technology 9.20 (2016): 1-5. (Year: 2016).*

(Continued)

*Primary Examiner* — Techane Gergiso
(74) *Attorney, Agent, or Firm* — Robert J. Shatto

(57) ABSTRACT

Provided is a method for disabling encryption of data in motion in response to an event. The method includes a service processing data. The service may process the data while in a public mode, in which the service is configured to encrypt data in motion. The method further comprises detecting an event that triggers the service to go into a protected mode. The method further comprises isolating the service from one or more public systems in response to detecting the event. The method further comprises deactivating encryption of data in motion, and processing the data without encrypting the data while in motion.

20 Claims, 8 Drawing Sheets

(56) References Cited

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Unknown, "Torrent Encryption 101," https://www.best-bittorrent-vpn.com/torrent-encryption.html, printed Aug. 30, 2019, 9 pgs.

* cited by examiner

SELECTIVE ENCRYPTION OF DATA IN MOTION

BACKGROUND

The present disclosure relates generally to the field of computing, and more particularly to processing data in motion using selective encryption.

Cloud computing, sometimes referred to simply as the "cloud," is the use of computing resources—servers, database management, data storage, networking, software applications, and special capabilities such as blockchain and artificial intelligence (AI)—over a network. There are several types of cloud computing models, such as public cloud, private cloud, and hybrid cloud, each having its own advantages and disadvantages. Each cloud model also has its own security risks, especially when the cloud includes or is connected to public computers (e.g., over the internet).

SUMMARY

Embodiments of the present disclosure include a method, computer program product, and system for disabling encryption of data in motion in response to an event. The method includes a service processing data. The service may process the data while in a public mode, in which the service is configured to encrypt data in motion. The method further comprises detecting an event that triggers the service to go into a protected mode. The method further comprises isolating the service from one or more public systems in response to detecting the event. The method further comprises deactivating encryption of data in motion, and processing the data without encrypting the data while in motion.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
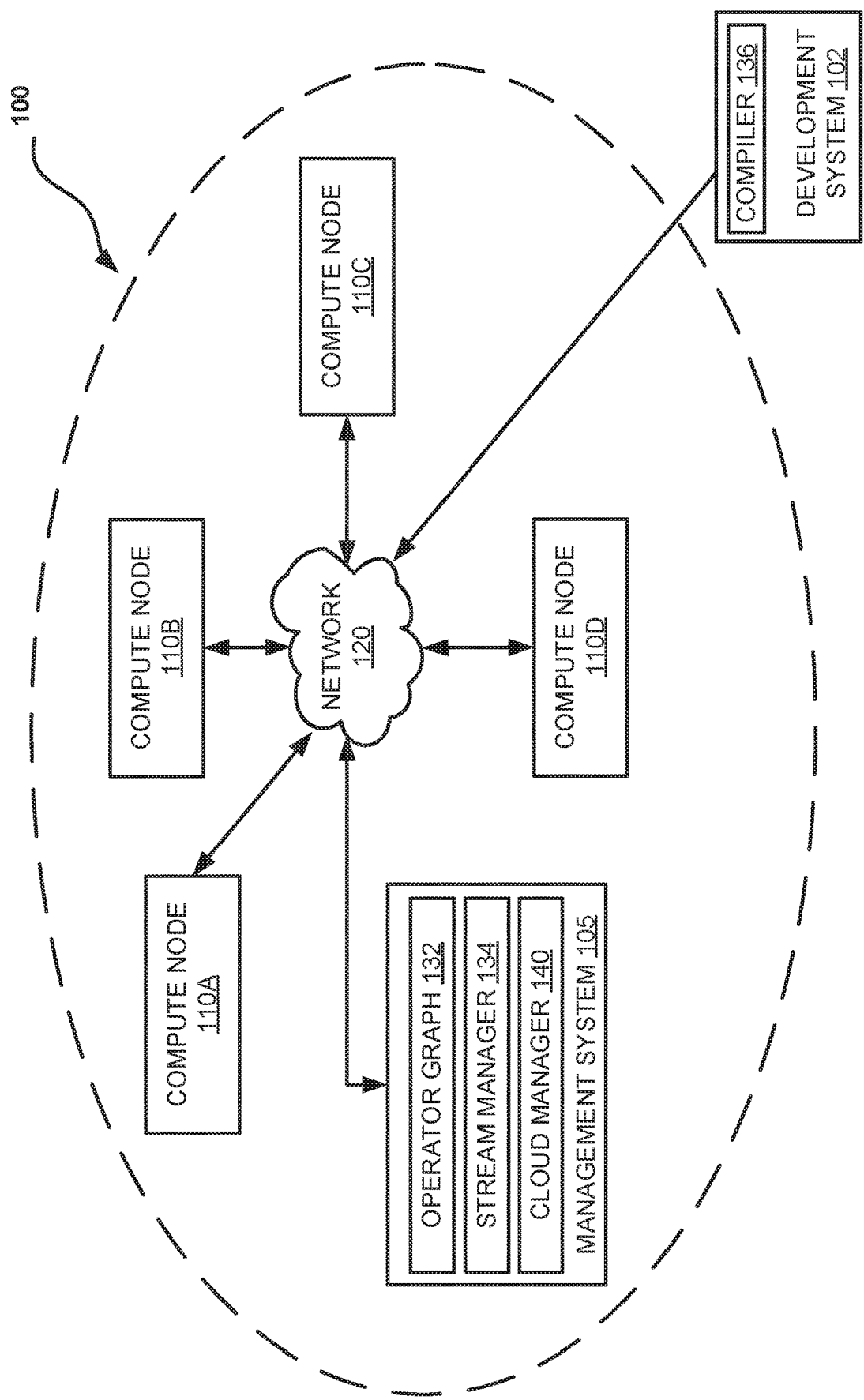
FIG. 1 illustrates a computing infrastructure configured to execute a stream computing application, according to various embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to processing data in motion using selective encryption. While the present disclosure is not necessarily limited to such applications, various aspects of the disclosure may be appreciated through a discussion of various examples using this context.

Cloud environments are becoming more and more popular as businesses choose to run their workloads in hosted, managed infrastructures instead of owning the computing environments themselves. There are different types of clouds, including public, private, hybrid, etc., and each one comes with its own set of security considerations. For example, public clouds are shared by multiple customers, often many thousands of customers, and are accessible via the internet. As such, data processed in public clouds may be more vulnerable than data processed in private clouds, which are deployed and managed for a single customer/tenant, and are often hosted on-premises.

In order for public cloud environments to meet certain security standards, encryption of data is required. Streaming analytic platforms like IBM® InfoSphere Streams™, Microsoft Azure® Stream Analytics, and Amazon Kinesis®, which can be operated in the public cloud environments, process data in motion. In public cloud environments, encryption of data in motion (also referred to herein as data "in flight" or data "in transit") is required. In other words, data is encrypted whenever it is being moved from one computing unit to another. Because most processing cannot be done directly on encrypted data, encryption of data in motion requires that each compute unit (e.g., processor) that processes the data decrypt the data it receives, process the decrypted data, and encrypt the new/processed data before sending it along to another compute unit for processing. For example, data that is processed by four different compute units must be decrypted four times and encrypted four times. In practical application, the data may be processed by significantly more computer units. As such, encryption of data in motion introduces substantial overhead in the processing of data.

Embodiments of the present disclosure provide a mechanism to improve performance in environments like these where encryption of data in motion is performed today. This is done by switching a service running in a public cloud from a public mode (i.e., a mode where data in motion is encrypted) to a protected mode (where the data is not encrypted while in motion) when conditions allow. This may advantageously eliminate or reduce the overhead of encryption of data in motion when the service does not require a connection to the public and the security risks of such connection do not exist.

In some embodiments, the service operates as a public cloud service, consuming data from sources in the public, and/or sending/publishing information to entities in public. A planned or unplanned event occurs, triggering the service to switch into protected mode. The event may be any event that stops the services from retrieving data from, or publishing data to, the public. For example, if the service is a weather service that collects data from a public weather system, and that public weather system goes down, the service is no longer receiving data from a public system.

In response to the event, the service is transitioned into a protected mode. In other words, protection of the service is enabled, isolating it from the public internet. The service may be isolated from the public internet by, for example, enabling firewalls, deploying network policies, etc. Encryption of data in motion is then turned off because the service is now in protected mode. In other words, once the service is isolated from the public (e.g., the public internet), the risks associated with being connected to public devices is gone, so the encryption of data in motion is turned off, and the data continues to be processed. This enables better performance and/or more efficient use of resources since the compute units do not need to decrypt data before processing it or encrypt the resulting data before sending it off. While processing data in the protected mode, the overhead of encrypting the data may be reduced or eliminated, freeing up computing resources to process the data itself, as opposed to encrypting/decrypting it, thereby increasing throughput and reducing the amount of time required to process the data.

In some embodiments, the data continues to be processed in an unencrypted form until another event is detected which causes the system to reconnect to the public. As above, this could be a planned or unplanned event that triggers the service to switch back into public mode. Following the above example, the trigger could be the public weather system recovering from its failed state and being back online. In response to the event, the service is transitioned into the public mode, and encryption of data in motion is turned back on. Transitioning the service back to the public mode may include enabling encryption of data in motion, encrypting all unencrypted data that is being moved, and disabling protection of the service (e.g., isolation) by, for example, disabling the firewalls, deploying new network policies, etc., thereby opening the service to the public internet. The service then reverts back to operating as a public cloud service, consuming data from sources in public, and/or sending/publishing information to entities in public.

It is to be understood that the aforementioned advantages are example advantages and should not be construed as limiting. Embodiments of the present disclosure can contain all, some, or none of the aforementioned advantages while remaining within the spirit and scope of the present disclosure.

As discussed above, embodiments of the present disclosure may be employed in computing paradigms that process data in motion, such as streams computing. Accordingly, an understanding of the embodiments of the present disclosure may be aided by describing embodiments of streams computing systems and the environments in which these systems may operate.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts— which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
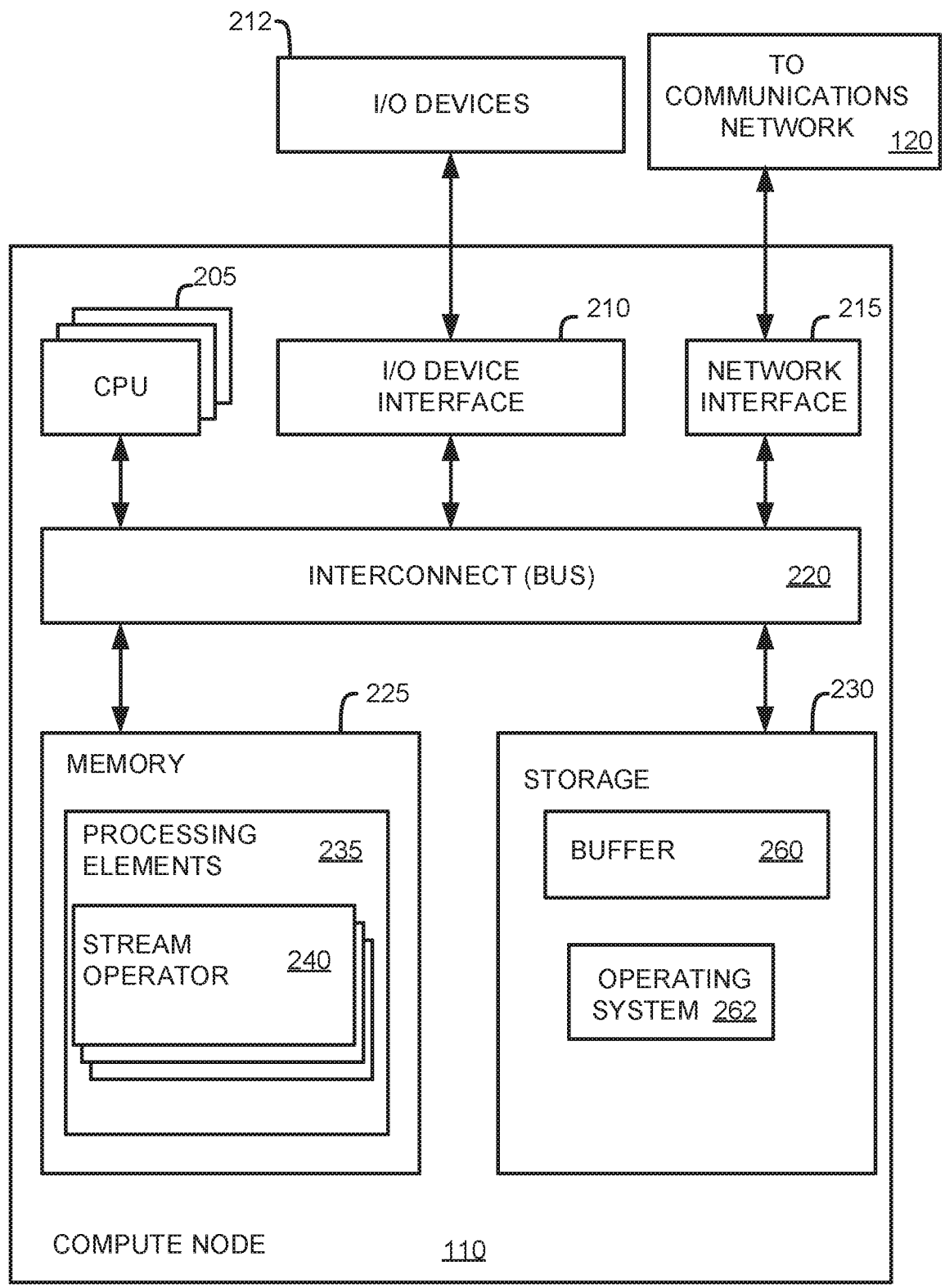
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
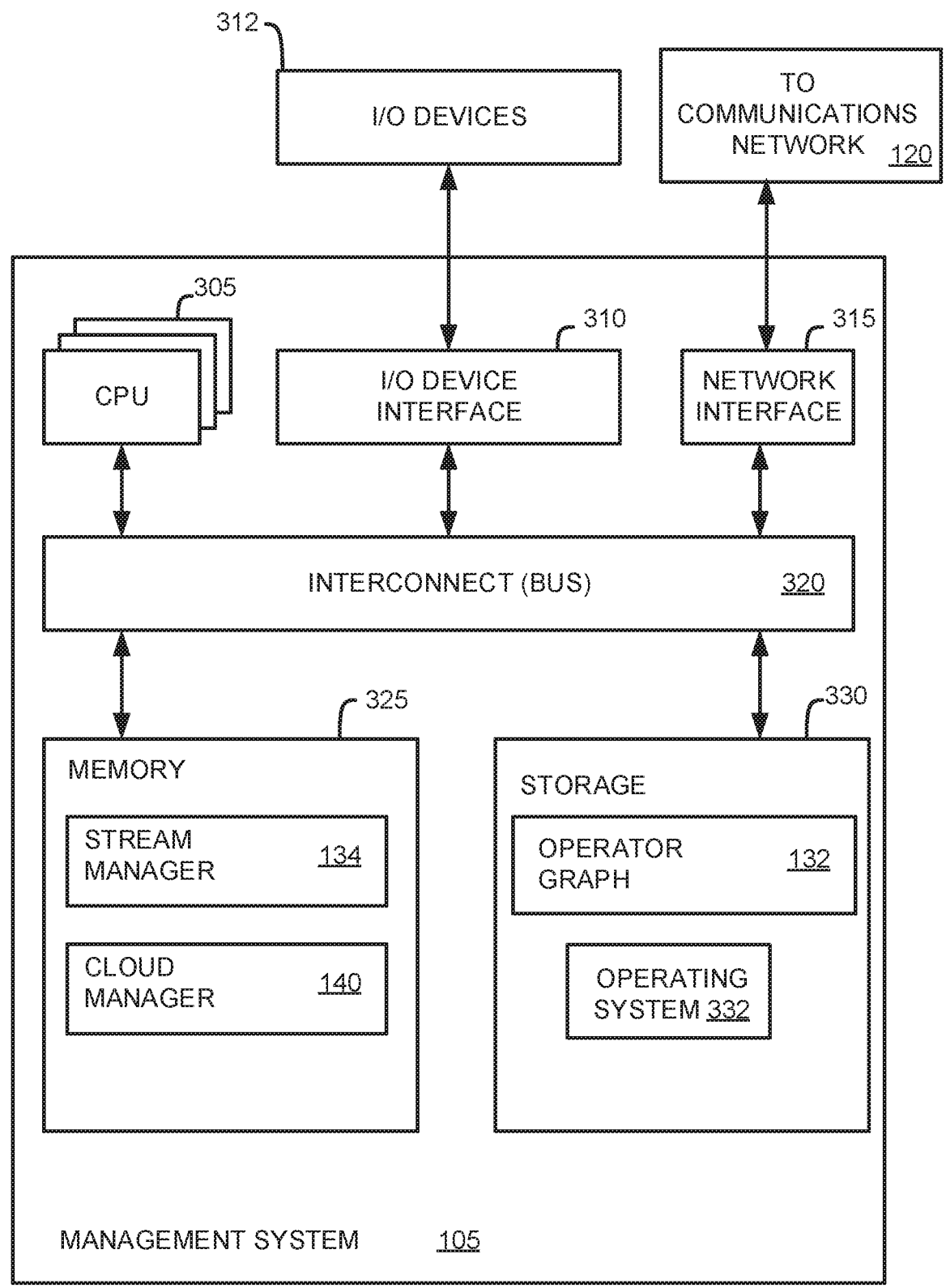
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
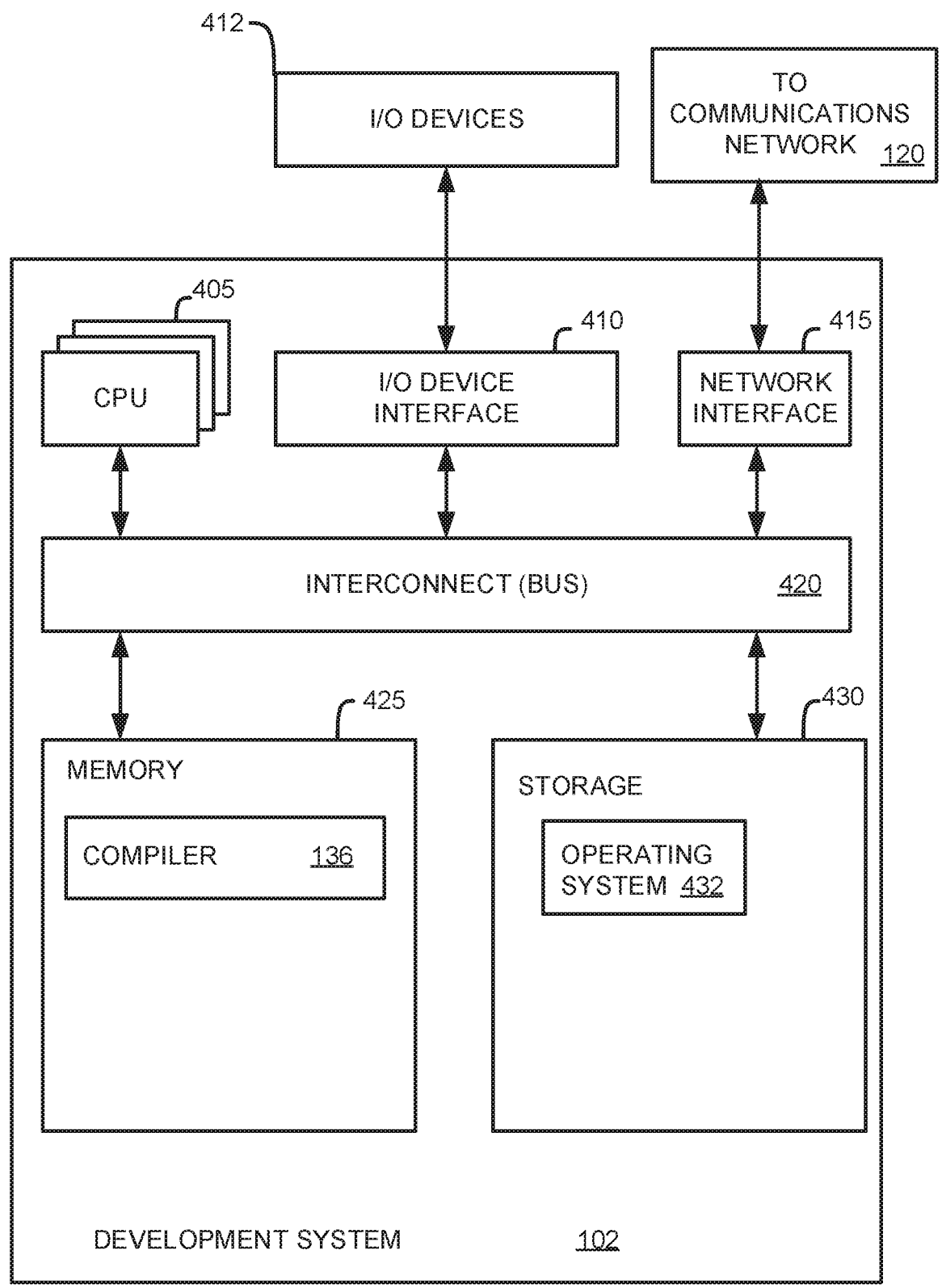
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
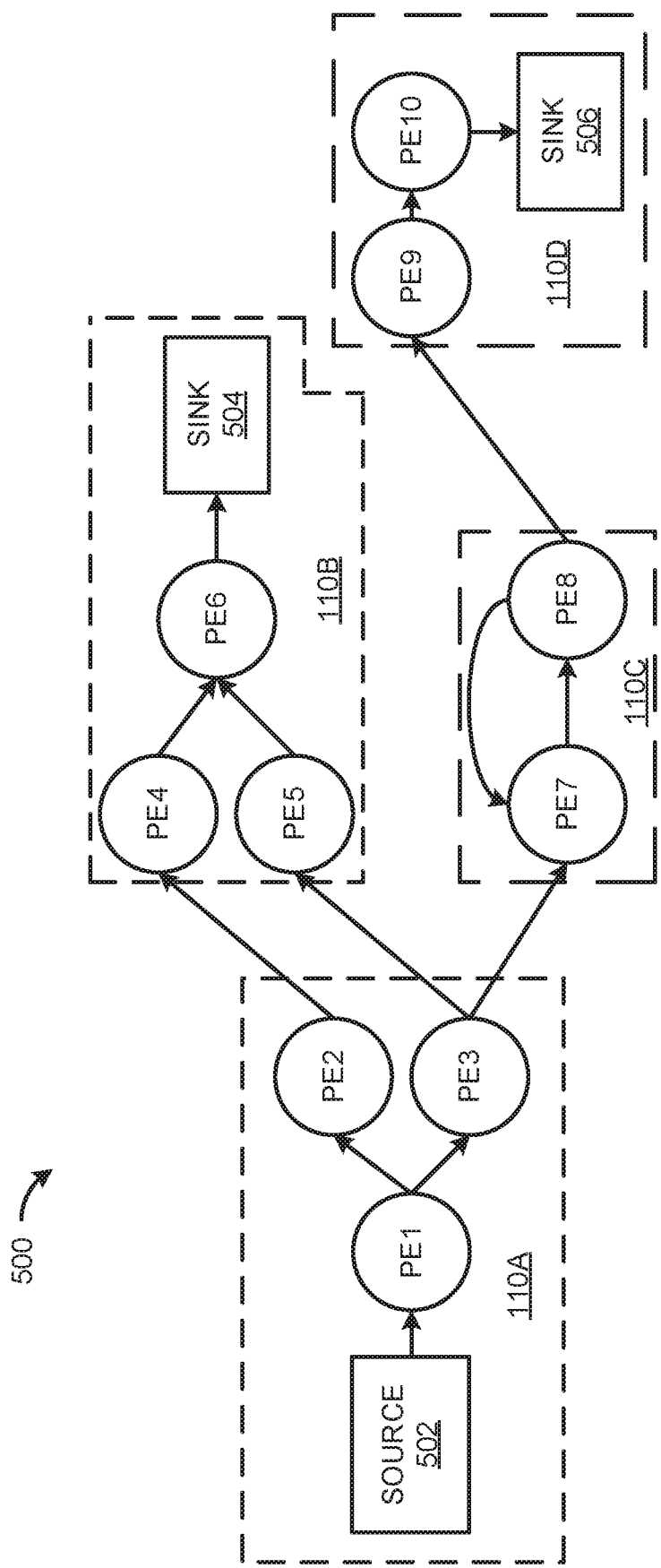
FIG. 5 illustrates an operator graph for a stream computing application, according to various embodiments.

FIG. 5 illustrates an exemplary operator graph 500 for a stream computing application (e.g., a service) beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

The cloud manager 140 of FIG. 1 may be configured to monitor operation of the cloud services funning on the computer nodes (e.g., compute nodes 110A-110D). The cloud manager 140 may be further configured to make changes to various operating settings of the computing infrastructure 100. For example, the cloud manager 140 may monitor connections between the computing infrastructure 100 and other computers/systems to identify whether an event has occurred that should trigger protective mode. The cloud manager 140 may further be configured to effectuate the change from protected mode and normal mode. For example, the cloud manager may cut off access to the internet (e.g., using a firewall) and enable encryption-less transmission of data within the cloud infrastructure 100 to place the system into protected mode.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

When used in a public cloud environment, which may include hybrid clouds since they have a public cloud component, and specifically in the public mode disclosed herein, the tuples may be encrypted while they move between processing elements and/or stream operators. For example, data retrieved from the source 502 may be processed by the first processing element PE1, resulting in the generation of one or more new tuples. These new tuples may be encrypted by the first processing element PE1 prior to being sent to the second and third processing elements PE2, PE3. In order to perform their respective operations on these received tuples, the second and third processing elements PE2, PE3 first have to decrypt the one or more new tuples. Similarly, prior to sending tuples downstream, the second and third processing elements PE2, PE3 must first encrypt the tuples that they generate.

However, the system shown in FIG. 5 may be configured to switch to a protected mode in response to a triggering event. For example, if the source 502 is public, but the remaining processing elements (including sink 504 and sink 506) are not, the system may transition to the protect mode in response to the connection between the source 502 and the first processing element PE1 being broken. For example, if the source 502 provides stock prices during trading hours, the system (e.g., using cloud manager 140 and/or stream manager 134) may be configured to disconnect the first processing element PE1 from the source 502 at 4 p.m. eastern (the market closing time) every day. This may be done using various techniques as would be known by a person of ordinary skill. For example, firewalls may be deployed or enabled to prevent the source 502 and first processing element PE1 from communicating.

Once the system is isolated from the public, the system may deactivate or disable encryption of data in motion. Accordingly, the processing elements PE1-PE10 may communicate with each other without the use of encryption. For example, the first processing element PE1 may transmit unencrypted tuples to the second and third processing elements PE2, PE3, which may process those tuples and then send unencrypted tuples to the fourth, fifth, and seventh processing elements PE4, PE5, and PE7, etc. Because the data is being sent in an unencrypted form, the overhead of having each processing element (or stream operator, as the case may be) decrypt the received data before processing it and encrypt the processed data before sending it downstream can be removed.

Figure 6:
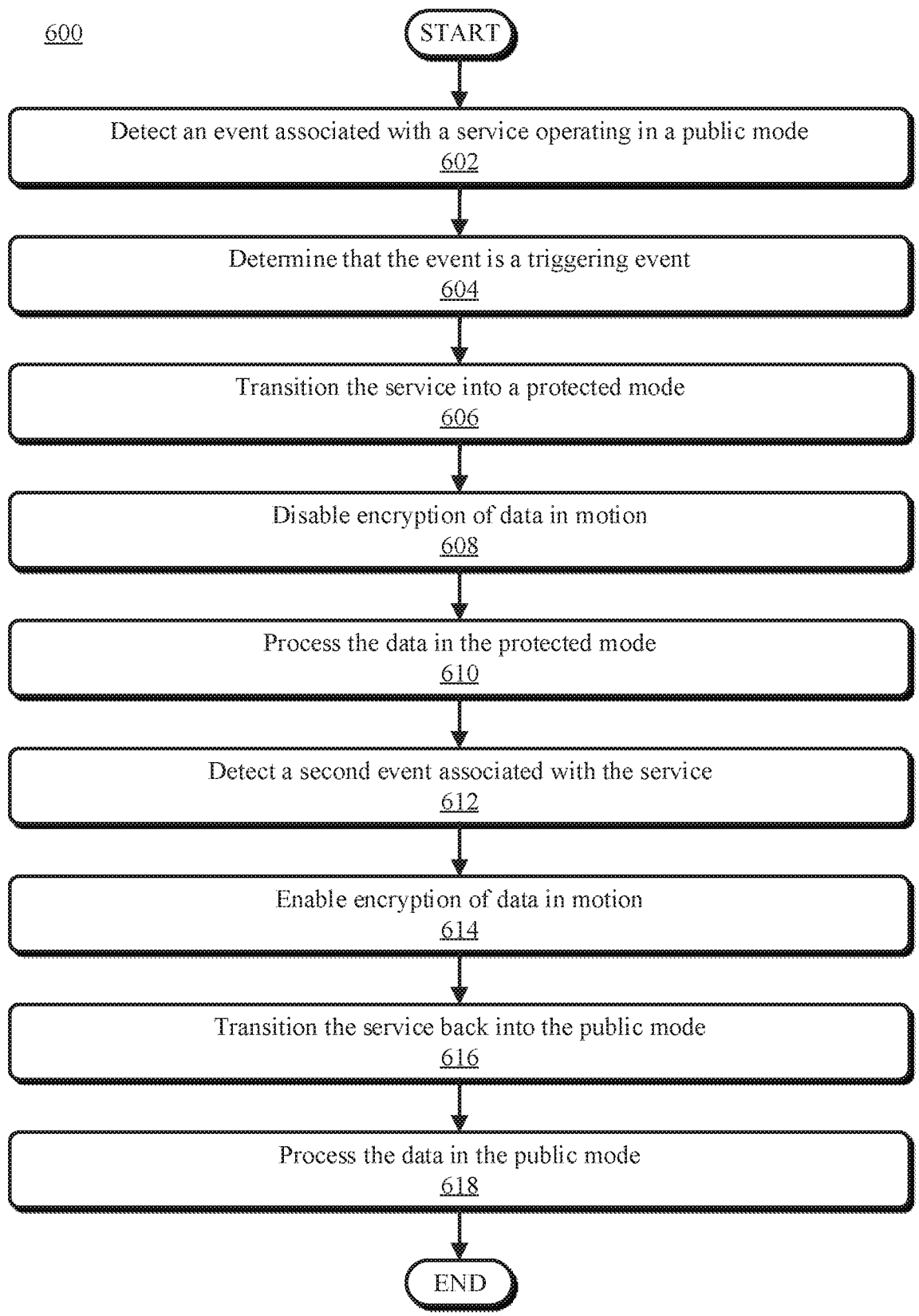
FIG. 6 illustrates a flowchart of an example method for switching data processing between a public mode and a protected mode in response to triggering events, in accordance with embodiments of the present disclosure.

Referring now to FIG. 6, illustrated is a flowchart of an example method 600 for switching a service running in a public cloud from public mode to protected mode in order to avoid the overhead of encrypting data in motion, in accordance with embodiments of the present disclosure. The method 600 may be performed by hardware, firmware, software executing on a processor, or any combination thereof. For example, the method 600 may be performed by a processor operating as a cloud manager (e.g., cloud manager 140 of FIG. 1). The method 600 may begin at operation 602, wherein a processor may detect an event associated with a service.

In some embodiments, the service operates as a public cloud service, consuming data from sources in public, and/or sending/publishing information to entities in public. The data is encrypted while in motion when the service is operating as a public cloud service. The service may be monitored for the occurrence of one or more events, planned or unplanned, which may cause the service to switch into a protected mode. For example, monitoring execution of the service may include monitoring connections between the service and public resources, such as computer connected to the cloud over the internet. In this context, an event may be the connection or disconnection of the service from public resources.

The detected event may be planned (e.g., a known outage of a connected public system, such as for scheduled maintenance, a daily event, etc.) or unplanned (e.g., an unexpected outage, a DDoS attack, etc.). At operation 604, the processor determines whether the event is a triggering event (i.e., an event that triggers the system to switch from the public mode to the protected mode or vice versa). For example, the processor may determine whether the event means that the system no longer needs to be, or should not be, connected to public resources (e.g., over the internet).

In some embodiments, determining whether an event is a triggering event may include utilizing a set of rules. The rules may include a condition (or event) and a response for each condition. For example, the system may have a rule that it is to switch into the protected mode at a given time each day (e.g., when a stock market closes). Likewise, the system may include a rule that it is to switch into the public mode at a different time each day (e.g., when a stock market opens).

Some rules may be based on connections to the service. For example, the system may be configured to receive information from a particular public source/system. If that source goes offline, the system may effectively be disconnected from the public. As such, the system may include a rule that causes it to switch into the protected mode if the public source unexpectedly goes offline for more than a threshold amount of time, or during known/planned outages of the public source.

In response to determining that the event is a triggering event, the service is transitioned into the protected mode at operation 606. Transitioning the service into the protected mode includes isolating the service from the public internet. This may be accomplished by, for example, enabling firewalls, deploying network policies, etc. Other method for isolating the service from the public can be utilized, and the embodiments disclosed herein are provided as non-limiting examples.

While in the protected mode, encryption of data in motion is turned off at operation 608 and the service continues to process data in the protected mode at operation 610. Because the service is now in the protected mode and is isolated from the public internet, the security vulnerabilities specific to the cloud being public are removed. As such, encryption of the data while in motion may no longer be necessary to satisfy security standards and/or best practices. Furthermore, because data can be more efficiently processed when not encrypted (e.g., the overhead of encrypting and decrypting the data at every step is removed), transitioning to the protected mode may enable better performance and/or more efficient use of resources of the service.

The service may continue to be monitored while operating in the protected mode, and at operation 612 the processor may detect a second event associated with the service. Monitoring of the service and detection of the second event may be performed as discussed with respect to operations 602 and 604. In this case, the second event may be an event that triggers the service to switch back into the public mode. For example, the detected event may be a planned or unplanned event that signals or indicates that data from public sources is needed again. In some embodiments, the event itself may cause the data from the public sources to be needed again.

For example, the service may collect large amounts of data from the public for processing. Once the data is collected (e.g., the first event), the service may switch into protected mode to more efficiently process that collected data. As the service nears completion of the processing, it may be configured to switch back into public mode to collect more data from the public. In this embodiment, the second event may be the determination that the service has nearly completed processing the data that it has already collected (e.g., within a threshold time of completion).

At operation 614, the processor enables encryption of data in motion. At operation 616, the service transitions back into the public mode. As discussed herein, transitioning the service may include, for example, changing settings of a firewall and/or deploying network policies. Once protection of the service is disabled, the service is opened up to the public internet. After transitioning the service back into the public mode, the service processes the data in the public mode (e.g., with encryption of data in motion) at operation 618 and the method 600 ends. In other words, the service reverts back to operating as a public cloud service, consuming data from sources in public, and/or sending/publishing information to entities in public.

Two example applications of embodiments of the present disclosure are provided for context of how this mechanism could be used in practice. It is to be understood that these example applications are provided for illustrative purposes only, and they are not to be limiting.

The first example is a coarse-grained example of how one or more of the techniques disclosed herein could be used to respond to a planned event is in the financial domain. A service running in a public cloud environment might be analyzing real-time options quotes, looking for attractive buying opportunities. While the market is open, the service runs in public mode because it is analyzing quotes and other data (possibly weather, news feeds, etc.) coming over the public internet. Data in motion is encrypted while in public mode to protect it from hacking or other attacks over the public internet. When the market closes, the service could switch into protected mode as access to data flowing over the public internet is not needed. Protected mode eliminates the need to encrypt the data in motion, consuming fewer resources and/or improving the performance of processing (such as building predictive models) that is performed while the market is closed. Shortly before the market opens up, the service can switch back into public mode so that it can gather and analyze quotes and other data over the public internet.

The second example is an example of how one or more of the techniques disclosed herein could be used to respond to an unplanned event, in this case a security issue. The service is running in public mode when the service (or a manager of the service, such as a cloud manager 140) detects that a security event has occurred. The event could be an industry-wide event (such as news of an IoT DDos attack), or it could be a potential exposure discovered by an intrusion detection system in the cloud environment. In either case, the service switches into protected mode until the event is resolved. Once the event is resolved, the service may switch back into a public mode.

In some embodiments, the service may operate differently in the public and protected modes. For example, in order to enable faster processing of data in the public mode, the service may perform fewer operations on the data to account for the performance/efficiency impact of having to decrypt and encrypt the data at each step. Accordingly, because the system can operate with a higher performance and efficiency while in the protected mode, the service may perform additional operations on the data in this mode.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
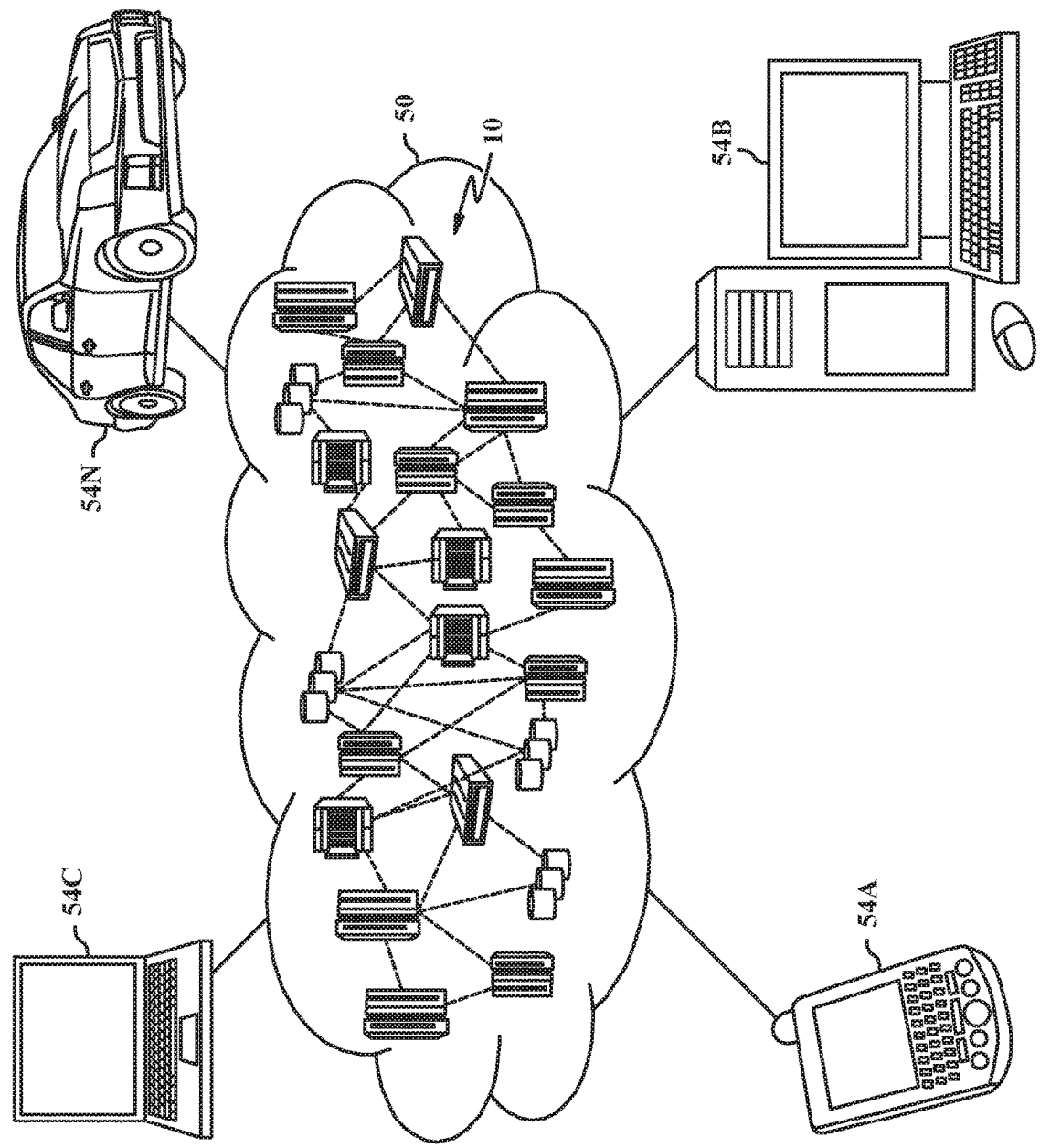
FIG. 7 depicts a cloud computing environment, in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
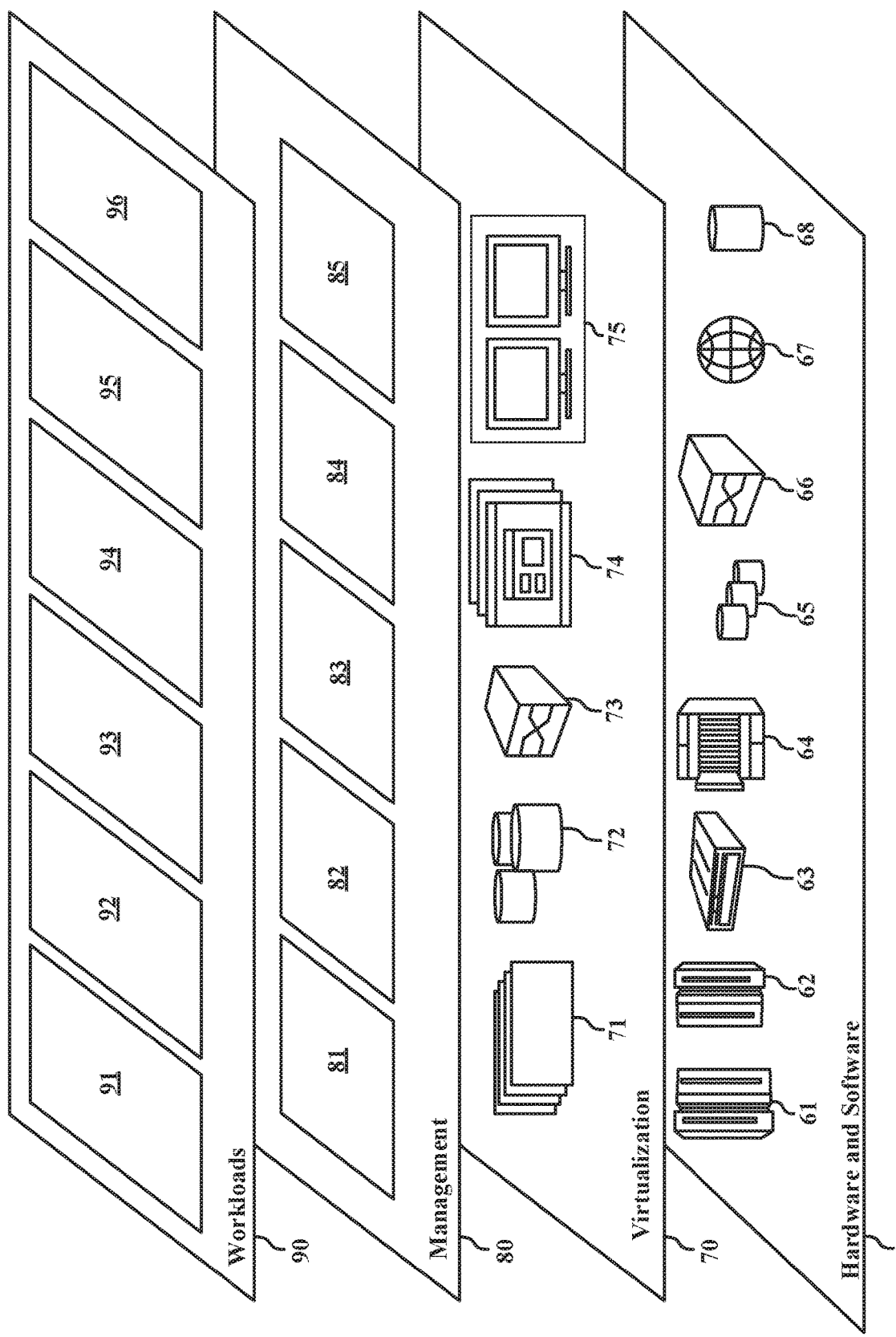
FIG. 8 depicts abstraction model layers, in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method comprising:
processing, by a service operating in a public mode, data, wherein the service is configured to encrypt data in motion while operating in the public mode;
detecting an event that triggers the service to go into a protected mode, wherein the service is configured to process data without encrypting the data while in motion when operating in the protected mode;
isolating, in response to detecting the event, the service from one or more public systems;
deactivating encryption of data in motion; and
processing the data in the protected mode.

2. The method of claim 1, wherein the service is running in a public cloud environment.

3. The method of claim 1, wherein detecting the event that triggers the service to go into the protected mode comprises:
monitoring information about the service;
detecting, based on the monitoring, an occurrence of the event; and
determining that the event is a triggering event using a set of rules, wherein a triggering event is an event that indicates that data from the one or more public systems is not needed by the service.

4. The method of claim 1, wherein isolating the service from the one or more public systems comprises enabling firewalls to block connections from the one or more public systems to the service.

5. The method of claim 1, wherein isolating the service from the one or more public systems comprises deploying network policies to block connections from the one or more public systems to the service.

6. The method of claim 1, the method further comprising:
detecting a second event that triggers the service to revert to the public mode;
enabling encryption of data in motion;
reconnecting the service to the one or more public systems; and
processing the data in the public mode.

7. The method of claim 1, wherein the service is running in a hybrid cloud environment.

8. A system comprising:
a memory; and
a processor communicatively coupled to the memory, wherein the processor is configured to perform a method comprising:
processing, by a service operating in a public mode, data, wherein the service is configured to encrypt data in motion while operating in the public mode;
switching, in response to detecting an event that triggers the service to go into a protected mode, the service from the public mode to the protected mode, wherein the switching comprises;
isolating the service from one or more public systems;
deactivating encryption of data in motion; and
decrypting at least some encrypted data being processed by the service; and
processing the data in the protected mode, wherein the data is processed without being encrypted while in motion in the protected mode.

9. The system of claim 8, wherein the service is running in a public cloud environment.

10. The system of claim 8, wherein detecting the event that triggers the service to go into the protected mode comprises:
monitoring information about the service;
detecting, based on the monitoring, an occurrence of the event; and
determining that the event is a triggering event using a set of rules, wherein a triggering event is an event that indicates that data from the one or more public systems is not needed by the service.

11. The system of claim 8, wherein isolating the service from the one or more public systems comprises enabling firewalls to block connections from the one or more public systems to the service.

12. The system of claim 8, wherein isolating the service from the one or more public systems comprises deploying network policies to block connections from the one or more public systems to the service.

13. The system of claim 8, wherein the method further comprises:
detecting a second event that triggers the service to revert to the public mode;
enabling encryption of data in motion;
reconnecting the service to the one or more public systems; and
processing the data in the public mode.

14. The system of claim 8, wherein the service is running in a hybrid cloud environment.

15. A computer program product comprising a computer readable storage medium having program instructions embodied therewith, the program instructions executable by a computer to perform a method comprising:
processing, by a service operating in a public mode, data, wherein the service is configured to encrypt data in motion while operating in the public mode;
detecting an event that triggers the service to go into a protected mode;
in response to detecting the event:
isolating the service from one or more public systems; and
deactivating encryption of data in motion; and
processing the data without encrypting the data while in motion.

16. The computer program product of claim 15, wherein the service is running in a public cloud environment.

17. The computer program product of claim 15, wherein detecting the event that triggers the service to go into the protected mode comprises:

monitoring information about the service;

detecting, based on the monitoring, an occurrence of the event; and determining that the event is a triggering event using a set of rules, wherein a triggering event is an event that indicates that data from the one or more public systems is not needed by the service.

18. The computer program product of claim 15, wherein isolating the service from the one or more public systems comprises enabling firewalls to block connections from the one or more public systems to the service.

19. The computer program product of claim 15, wherein isolating the service from the one or more public systems comprises deploying network policies to block connections from the one or more public systems to the service.

20. The computer program product of claim 15, wherein the method further comprises:

detecting a second event that triggers the service to revert to the public mode;

enabling encryption of data in motion;

reconnecting the service to the one or more public systems; and processing the data in the public mode.

\* \* \* \* \*